United States Patent
Luxon

(10) Patent No.: US 6,308,646 B1
(45) Date of Patent: Oct. 30, 2001

(54) TUNING ORIFICE FOR PNEUMATIC METERING MANIFOLD

(75) Inventor: Gary Deloy Luxon, Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/528,691

(22) Filed: Mar. 20, 2000

(51) Int. Cl.⁷ ........................................ A01C 7/00
(52) U.S. Cl. .................. 111/175; 222/547; 222/564; 138/44
(58) Field of Search .................. 111/170, 174, 111/175, 176, 177, 200; 138/40, 44; 221/211, 311, 312 R; 222/171, 172, 617, 212, 537, 547, 564

(56) References Cited

U.S. PATENT DOCUMENTS

| | | | |
|---|---|---|---|
| 3,972,121 | * 8/1976 | Nash | 32/27 |
| 4,118,173 | * 10/1978 | Shakiba | 431/202 |
| 4,616,577 | 10/1986 | van der Lely | 111/1 |
| 4,836,412 | 6/1989 | Webber et al. | 221/211 |
| 4,843,983 | 7/1989 | Olson | 111/174 |
| 4,872,785 | * 10/1989 | Schrage et al. | 406/155 |
| 5,027,861 | * 7/1991 | Gute | 138/45 |
| 5,097,814 | * 3/1992 | Smith | 123/590 |
| 5,515,795 | * 5/1996 | Ledermann et al. | 111/174 |
| 5,575,225 | * 11/1996 | Smith et al. | 111/174 |
| 5,592,974 | * 1/1997 | Grohs et al. | 138/44 |
| 5,740,746 | 4/1998 | Ledermann et al. | 111/174 |
| 6,024,129 | * 2/2000 | Schima | 138/44 |
| 6,047,652 | * 4/2000 | Prairie et al. | 111/174 |
| 6,164,222 | * 12/2000 | Mayerle et al. | 111/175 |

OTHER PUBLICATIONS

Deere & Company brochure entitled "MaxEmerge 2 Planters" front and back covers and pp. 2–6, printed in the U.S.A., 1994.

Deere & Company brochure entitled "MaxEmerge Plus Planters", front and back covers and pp. 8–9, printed in the U.S.A.

* cited by examiner

Primary Examiner—Victor Batson

(57) ABSTRACT

A seeding machine is provided with a frame having a plurality of pneumatic seed meters. An air pump located on the frame supplies air pressure to a pneumatic manifold. The pneumatic manifold in turn is pneumatically coupled to the seed meters by air hoses. Pneumatic orifices are pneumatically positioned between the pneumatic manifold and the portion of the seed meters closest to the air pump.

8 Claims, 2 Drawing Sheets

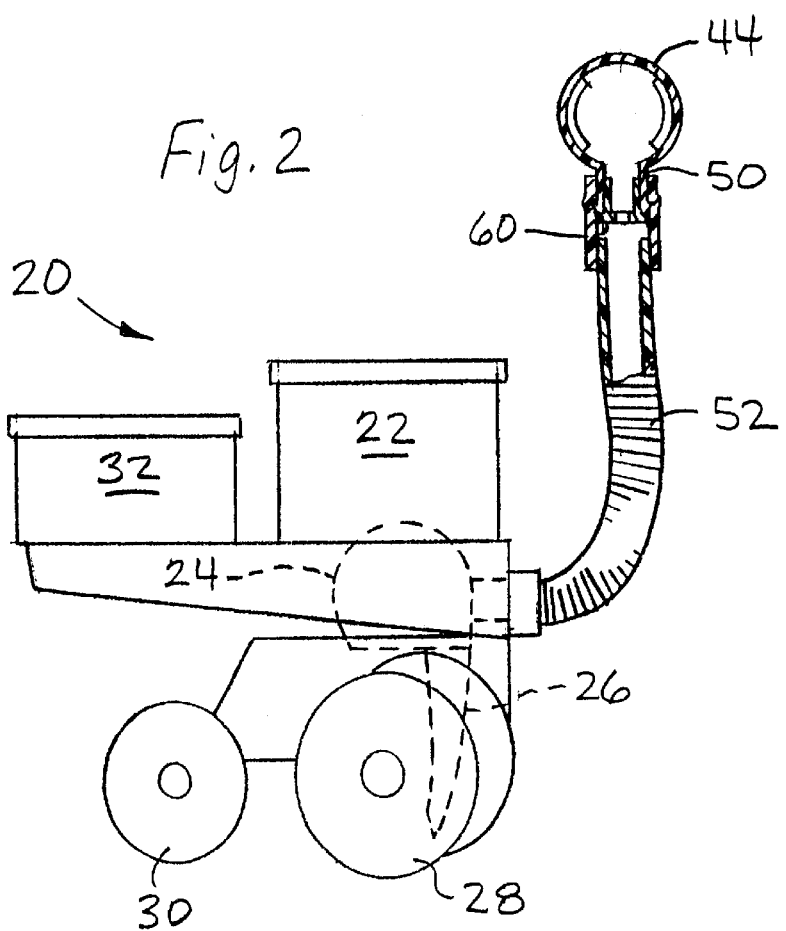
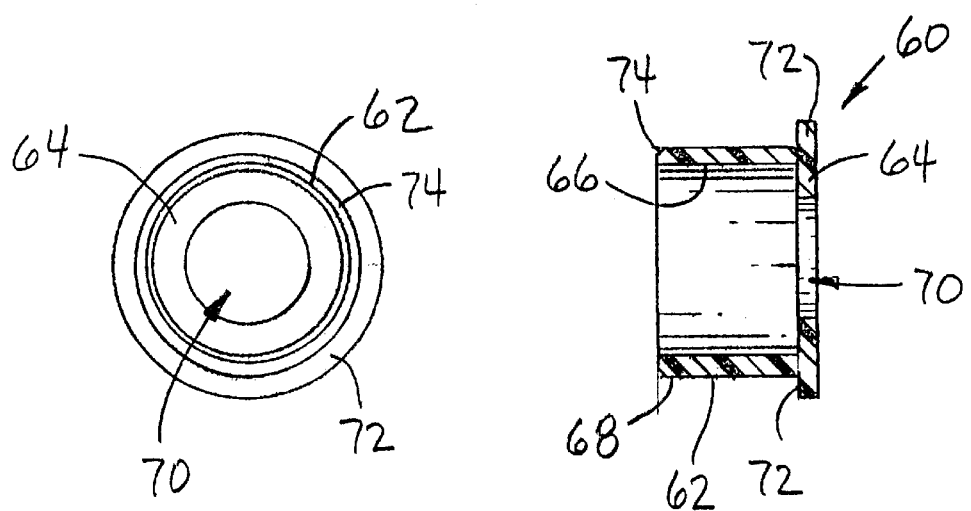

TUNING ORIFICE FOR PNEUMATIC METERING MANIFOLD

BACKGROUND OF THE INVENTION

1. Field of the Invention

The present invention is directed to using pneumatic orifices to tune a pneumatic manifold of a seeding machine to better distribute the air pressure between the various seed meters.

2. Description of the Prior Art

Modern seeding machines use sophisticated seed metering systems for controlling the rate at which seeds are planted. Many of these sophisticated metering systems use air pressure to control the application of seed to the ground. In one system positive air pressure is used. In other systems negative air pressure in the form of a vacuum is used to meter the seeds. This positive or negative air pressure is generated by an air pump in the form of a fan. This air pressure from the air pump is directed to a pneumatic manifold. The pneumatic manifold in turn is pneumatically coupled to the individual seed meters by hoses. The air pressure supplied to different row units is not identical. Such a condition results in uneven seed meter performance possibly resulting in variations in row-to-row seed populations and row-to-row seed spacing. The positive or negative air pressure is highest at those seed meters pneumatically closest to the source of pressurized air.

SUMMARY OF THE INVENTION

It is an object of the present invention to provide a simple pneumatic orifice that can more evenly distribute air pressure to pneumatic seed meters.

A seeding machine is provided with a frame having a plurality of pneumatic seed meters. An air pump located on the frame supplies air pressure to a pneumatic manifold. The pneumatic manifold in turn is pneumatically coupled to the seed meters by air hoses. Pneumatic orifices are pneumatically positioned between the pneumatic manifold and the portion of the seed meters closest to the air pump. The pneumatic manifold is provided with radially extending tube stubs that are coupled to the air hose. The pneumatic orifices are inserted into the appropriate tube stubs. The pneumatic orifices are formed of plastic and have a cylindrical sleeve portion defining an internal passage and a circular cover portion having a restricted passage. The internal passage being in pneumatic communication with restricted passage. The cover portion is also provided with a radially extending edge extending outward past the sleeve portion.

BRIEF DESCRIPTION OF THE DRAWINGS

FIG. 2 is a semi schematic side view of a planter row unit and the pneumatic distribution system.

FIG. 3 is a top view of the pneumatic orifice.

FIG. 4 is a cross sectional side view of the pneumatic orifice.

DETAILED DESCRIPTION

Figure 1:
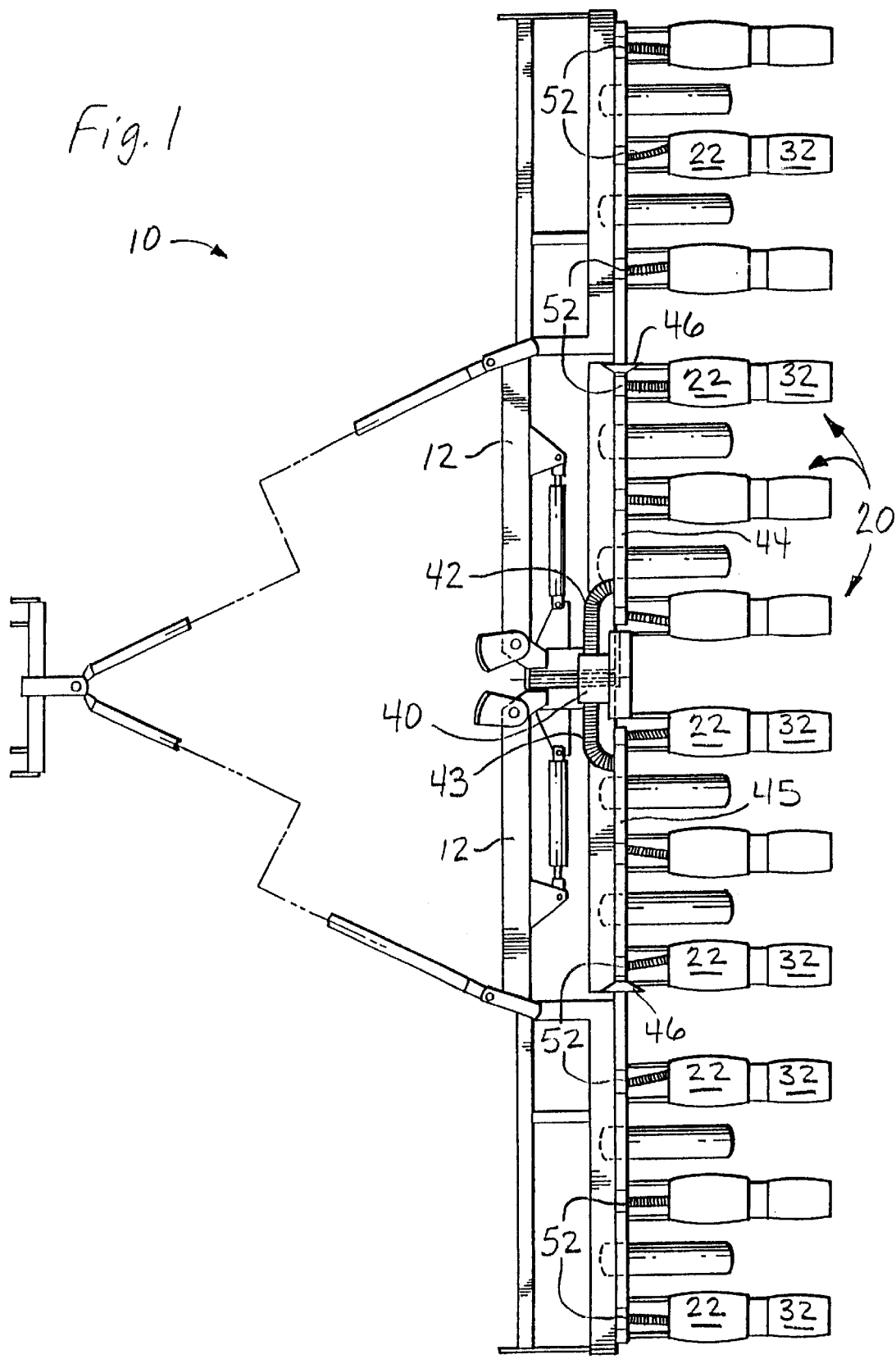
FIG. 1 is a top view of a row crop planter having a plurality of individual planting units.

FIG. 1 is a top view of a seeding machine 10. In the illustrated embodiment the seeding machine is a row crop planter, however the present invention could be used on other seeding machines having pneumatic seed meters, including grain drills and air seeders. The planter comprises a frame 12 that can be extended into a working configuration illustrated in FIG. 1 and folded into a transport configuration. A plurality of row crop planting units 20 are mounted to the frame 12. Each of the row crop planting units 20 is provided with a seed hopper 22 that directs seeds to a seed meter 24 which meters the seed. The metered seed is directed by a seed tube 26 from the seed meter 24 to a planting furrow formed in the ground by furrow opener 28. The planting furrow is closed by angled closing wheels 30. The planting unit may also be provided with a pesticide hopper 32 for carrying pesticides to be applied during the planting process.

The seed meter 24, in the illustrated embodiment, is a vacuum meter of the type presently marketed by the assignee of the present application. That is negative air pressure is used to attract seeds to a seeding disc as it passes through a seed puddle. The seeds remain in contact with the disc until the vacuum is removed and the seeds fall into the seed tube 26. The present invention could also be used with positive pressure systems, wherein a positive air pressure is used to drive the seeds to a seed disc as it revolves through a seed puddle. Removing the positive air pressure releases the seeds from the disc and the released seeds then drop into the seed tube 26.

An air pump 40 in the form of a fan creates an air pressure in two air tubes 42 and 43. The air tube 42 extends between the air pump 40 and the pneumatic manifold 44. The air tube 43 extends between the air pump 40 and the pneumatic manifold 45. Both pneumatic manifolds 44 and 45 comprise a cylindrical tube that extends along the frame 12. Both pneumatic manifolds 44 and 45 comprise two sections that are coupled together by a flapper coupling 46. The flapper coupling 46 allows each of the manifolds to be split apart as the planter frame 12 is being folded and to be rejoined when the planter frame is unfolded into its working configuration.

Each of the pneumatic manifolds 44 and 45 are provided with radially extending tube stubs 50 which are coupled to air hoses 52 for directing the air pressure in the pneumatic manifolds to the individual seed meters 24. A pneumatic orifice 60 is positioned between the pneumatic manifolds 44 and 45 and a portion of the row crop planting units 20. Each pneumatic orifice 60 comprises a cylindrical sleeve portion 62 and a circular cover portion 64. The cylindrical sleeve portion 62 is provided with a cylindrical internal surface 66 defining a cylindrical passage and a cylindrical external surface 68. The cover portion 64 is provided with a circular restricted passage 70 having a smaller diameter than the diameter of the cylindrical passage. In addition, the cover portion 64 has a radially extending edge 72 that extends past the external surface 68 of the sleeve portion 62.

In the preferred embodiment, the pneumatic orifice 60 is inserted into the radially extending stub tubes 50 pneumatically closest to the air pump 40. For example, pneumatic orifices 60 would be located in the two tube stubs 50 adjacent to the air tubes 42 and 44 so that the air pressure at the two respective seed meters 24 is restricted and more closely matches the air pressure at the remaining seed meters 24. Although in this example only four pneumatic orifices are fitted to the seeding machine 10, additional pneumatic orifices 60 could be inserted to better balance the air pressure supplied to the seed meters 24. However only a portion of the seed meters 24 would be provided with pneumatic orifices 60 and these would be located at the seed meters 24 pneumatically closest to the air pump 40.

The cylindrical external surface 62 of the sleeve portion 62 engages the internal surface of the radially extending tube stub 50 with the radially extending edge 72 providing a positive stop to further insertion. To facilitate insertion into the tube stub 50 the end of the sleeve portion 62 opposite the cover portion 64 is provided with a cylindrical canted edge 74.

The present invention should not be limited by the above described embodiments, but should be limited solely by the claims that follow.

I claim:

1. A seeding machine for planting seeds in a field, the seeding machine comprising:

a frame;

a plurality of seed meters coupled to the frame;

an air pump for generating air pressure is coupled to the frame and in pneumatic communication with a pneumatic manifold that is also mounted to the frame;

an air hose extends between the pneumatic manifold and the seed meter for directing air pressure to the seed meter;

a number of pneumatic orifices are pneumatically positioned between the pneumatic manifold and a portion of the seed meters, each of the pneumatic orifices has a restricted passage.

2. A seeding machine as defined by claim 1 wherein the pneumatic orifices are positioned in pneumatic communication with the portion of the seed meters pneumatically closest to the air pump.

3. A seeding machine as defined by claim 2 wherein the air pump generates a negative air pressure in the form of a vacuum that is directed to the pneumatic manifold.

4. A seeding machine as defined by claim 3 wherein the pneumatic manifold orifices are pneumatically positioned between the air hose and the pneumatic manifold.

5. A seeding machine as defined by claim 4 wherein the pneumatic manifold is provided with radially extending tube stubs that are coupled to the air hose.

6. A seeding machine as defined by claim 5 wherein each pneumatic orifice has a sleeve portion having an external surface and a cover portion having the restricted passage.

7. A seeding machine as defined by claim 6 wherein the radially extending tube stubs of the pneumatic manifold having an internal surface which engages the external surface of the pneumatic orifice when the orifice is mounted to the pneumatic manifold.

8. A seeding machine as defined by claim 7 wherein the seed meter is part of a row crop planting unit having a furrow opener and a seed hopper.

* * * * *